US009483503B2

(12) United States Patent
Qiu et al.

(10) Patent No.: US 9,483,503 B2
(45) Date of Patent: Nov. 1, 2016

(54) PLACING A DATABASE (71) Applicant: International Business Machines Corporation, Armonk, NY (US)

(72) Inventors: Jie Qiu, Beijing (CN); Berthold Reinwald, San Jose, CA (US); Qi Rong Wang, Beijing (CN); Tao Yu, Beijing (CN); Lei Zhi, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 13/901,617

(22) Filed: May 24, 2013

(65) Prior Publication Data

US 2013/0325906 A1  Dec. 5, 2013

(30) Foreign Application Priority Data

May 28, 2012  (CN) .......................... 2012 1 0169518

(51) Int. Cl.
*G06F 17/30* (2006.01)

(52) U.S. Cl.
CPC ................... *G06F 17/303* (2013.01)

(58) Field of Classification Search
CPC ............ G06F 17/3028; G06F 17/30221; G06F 17/30289; G06F 17/30595; G06F 17/303
USPC .......................................................... 707/803
See application file for complete search history.

(56) References Cited

U.S. PATENT DOCUMENTS

| | | | |
|---|---|---|---|
| 6,247,109 B1* | 6/2001 | Kleinsorge et al. ............ 712/13 |
| 6,260,068 B1* | 7/2001 | Zalewski .............. G06F 9/5077 |
| | | | 707/999.01 |
| 6,633,878 B1* | 10/2003 | Underwood ........... G06Q 10/10 |
| 8,595,192 B1* | 11/2013 | Manmohan ....... G06F 17/30289 |
| | | | 707/678 |
| 2002/0052914 A1* | 5/2002 | Zalewski et al. ............. 709/203 |
| 2004/0225952 A1* | 11/2004 | Brown ...................... G06F 8/20 |
| | | | 714/819 |
| 2005/0038834 A1* | 2/2005 | Souder .................. G06F 9/5027 |
| 2005/0144189 A1* | 6/2005 | Edwards ........... G06F 17/30221 |
| 2006/0074955 A1* | 4/2006 | Kuersch ............ G06F 17/30557 |

(Continued)

FOREIGN PATENT DOCUMENTS

| | | |
|---|---|---|
| CN | 101853917 A | 10/2010 |
| CN | 101930798 A | 12/2010 |
| WO | WO 2012/000879 A1 | 1/2012 |

OTHER PUBLICATIONS

Ashraf Aboulnaga et al., "Deploying Database Appliances int he Cloud," Bulletin of IEEE Comp. Soc. Tech. Comm. on Data Engr., 2009, p. 1-8.

(Continued)

*Primary Examiner* — Hosain Alam
*Assistant Examiner* — Saba Ahmed
(74) *Attorney, Agent, or Firm* — Kurt Goudy (57) ABSTRACT

A method and system for placing database. The method includes: receiving a request of creating a new database; determining whether there is a need to migrate current database among current virtual machines based on resource demand and free resource in the current virtual machines; determining database placement plan based on the resource demand, migration strategy and migration cost associated with the migration strategy in response to whether there is a need to migrate the database; and executing the database placement plan. The invention can help a database service provider to optimize database layout in database provision through database migration.

20 Claims, 8 Drawing Sheets

(56) References Cited

U.S. PATENT DOCUMENTS

| | | |
|---|---|---|
| 2009/0172125 A1 | 7/2009 | Shekhar et al. |
| 2010/0250499 A1 | 9/2010 | McAlister |
| 2010/0250744 A1 | 9/2010 | Hadad |
| 2011/0078679 A1 | 3/2011 | Bozek |
| 2011/0126168 A1* | 5/2011 | Ilyayev ............... G06F 9/5072 717/103 |
| 2011/0142053 A1* | 6/2011 | Van Der Merwe ..... H04L 47/72 370/395.1 |
| 2011/0191389 A1 | 8/2011 | Okamoto |
| 2011/0252073 A1* | 10/2011 | Pauly ............... G06F 17/30091 707/812 |
| 2012/0101994 A1* | 4/2012 | Baffier ..................... G06F 8/61 707/640 |
| 2013/0085742 A1* | 4/2013 | Barker ................. G06F 9/5088 703/22 |

OTHER PUBLICATIONS

Jing T. Piao et al., "Network Aware Virtual Machine Placement and Migration Approach in Cloud Computing," Grid & Cooperative Computing (GCC), 2010 9th International Conference.

Pengcheng Xiong et al., "Intelligent Management of Virtualized Resources for Database Systems in Cloud Computing," Data Engr (ICDE), 2011 IEEE 27th Intl Conference, p. 87-88.

* cited by examiner

PLACING A DATABASE

CROSS-REFERENCE TO RELATED APPLICATION

This application claims priority under 35 U.S.C. §119 from Chinese Patent Application No. 201210169518.9 filed May 28, 2012, the entire contents of which are incorporated herein by reference.

BACKGROUND OF THE INVENTION

1. Field of the Invention

The present invention generally is related to processing of database, and more specifically, to a method and system of placing database.

2. Description of the Related Art

Database service is an emerging industry and technology. In database service, database requester (i.e. user) does not need to maintain the database and does not need to worry about availability and security of the database, and only needs to pay as needed, which saves user cost. Current database service provider generally creates a Virtual Machine (VM) for each database request the virtual machine can not be shared among different users, causing waste in virtual machine resource and increase in cost.

SUMMARY OF THE INVENTION

If one virtual machine (VM) is to be used to support multiple databases, there is a problem of database placement; however, content of subsequent database request is unpredictable for database service provider, so databases can not be reasonably laid out at the very beginning (e.g., databases can only be placed in sequence in the virtual machine, and when resource in one virtual machine is not sufficient to place a new database, a new VM needs to be created for the new database). This will necessarily cause waste in resource, because it is difficult to utilize resource of each virtual machine at maximum degree. For example, free storage size of a virtual machine is 12 GB, however, storage size required by a new database request is 20 GB, then a new virtual machine must be created for this new database request, thus the remaining 12 GB storage resource in the current virtual machine may be wasted.

It is found by inventor of the invention that, in order to reasonably arrange databases on virtual machine(s), there is a need to continually migrate database(s) during service provision, so as to make layout of databases on virtual machine(s) more appropriate, and to make resource utilization higher. In contrast to migration of an application, migration cost of a database primarily depends on factors such as size of storage occupied by that database etc. That is, migration cost of a database may vary significantly according to condition of various databases (e.g. according to different storage size). It is found by inventor of the invention that, in order to select an appropriate migration scheme, constraint on migration cost needs to be considered in determining a migration scheme, so that a database that is suitable for migration can be determined to achieve optimization in database layout.

Thus, in order to solve the above problems in the art, the invention provides a database placement method and a database placement system.

One aspect of the present invention provides a method of placing a database. The method includes receiving a request for creating a new database. The request includes a resource demand for the new database. The method further includes determining whether there is a need to migrate at least one current database among current virtual machines. The need to migrate at least one current database is based on the resource demand and free resource in the current virtual machines. The method further includes determining a database placement plan for at least one database based on the resource demand, migration strategy, and migration cost associated with the migration strategy, in response to the need to migrate at least one database. The method further includes executing the database plan.

Another aspect of the present invention provides a system of place a database. The system includes a receiving means configured to receive a request for creating a new database. The request includes a resource demand for the new database. The system further includes a first determining means configured to determine whether there is a need to migrate at least one current database among current virtual machines. The need to migrate at least one current database is based on the resource demand and free source in current virtual machines. The system further includes a second determined means configured to determine a database placement plan for at least one database based on the resource demand, migration strategy, and migration cost associated with the migration strategy, in response to a need to migrate at least one database. The system further includes an executing means configured to execute the database placement plan.

The above database placement method or database placement system can help a database service provider to optimize database layout in database provision through database migration. The present invention takes into account migration cost in determining database placement scheme, hence providing cost-controllable database(s) placement plan.

In embodiments hereinafter, the above or other advantages of the present invention will be explained in conjunction with more specific embodiments.

BRIEF DESCRIPTION OF THE DRAWINGS

Through the more detailed description of some embodiments of the present invention in the accompanying drawings, the above and other objects, features and advantages of the present disclosure will become more apparent, where the same reference generally refers to the same components in the embodiments of the present invention.

DETAILED DESCRIPTION OF THE PREFERRED EMBODIMENTS

Some preferable embodiments of the present invention will be described in more detail with reference to the accompanying drawings, in which the preferable embodiments of the present invention have been illustrated. However, the present invention can be implemented in various manners, and should not be construed to be limited to the embodiments disclosed. On the contrary, those embodiments are provided for the thorough and complete understanding of the present disclosure, and completely conveying the scope of the present invention to those skilled in the art.

It is understood in advance that although this disclosure includes a detailed description on cloud computing, implementation of the teachings recited are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure including a network of interconnected nodes.

Figure 1:
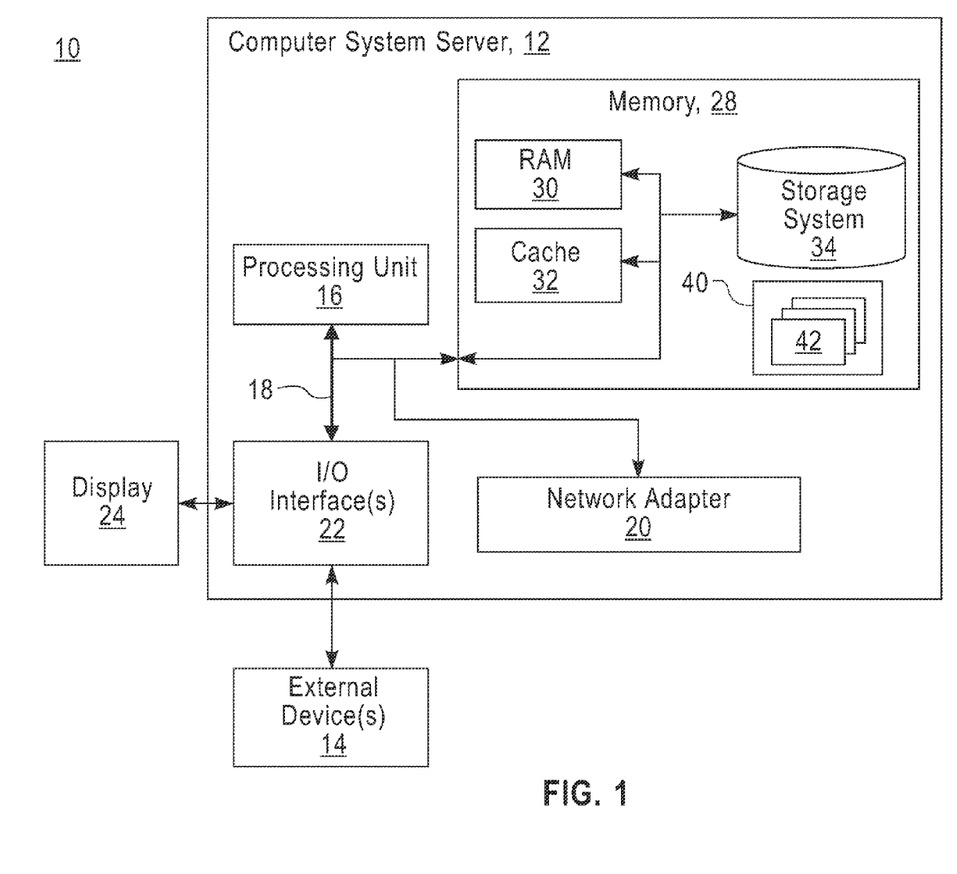
FIG. 1 depicts a cloud computing node according to an embodiment of the present invention.

Referring to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that can be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 can be described in the general context of computer system-executable instructions, such as program modules, being executed by a computer system. Generally, program modules can include routines, programs, objects, components, logic, data structures, and so on that perform particular tasks or implement particular abstract data types. Computer system/server 12 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, computer system/server 12 in cloud computing node 10 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any variety of bus architectures. For example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination, can include an implementation of a networking environment. Program modules 42 generally carry out the functions and/or methodologies of embodiments of the invention as described.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
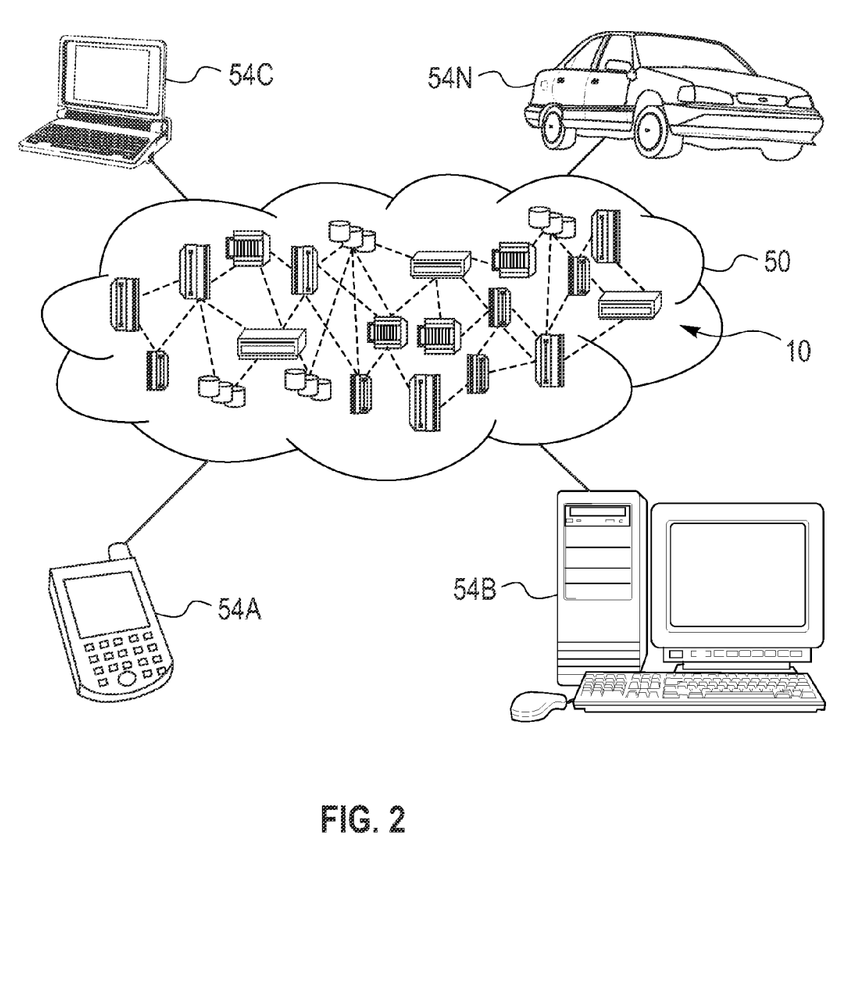
FIG. 2 depicts a cloud computing environment according to a further embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
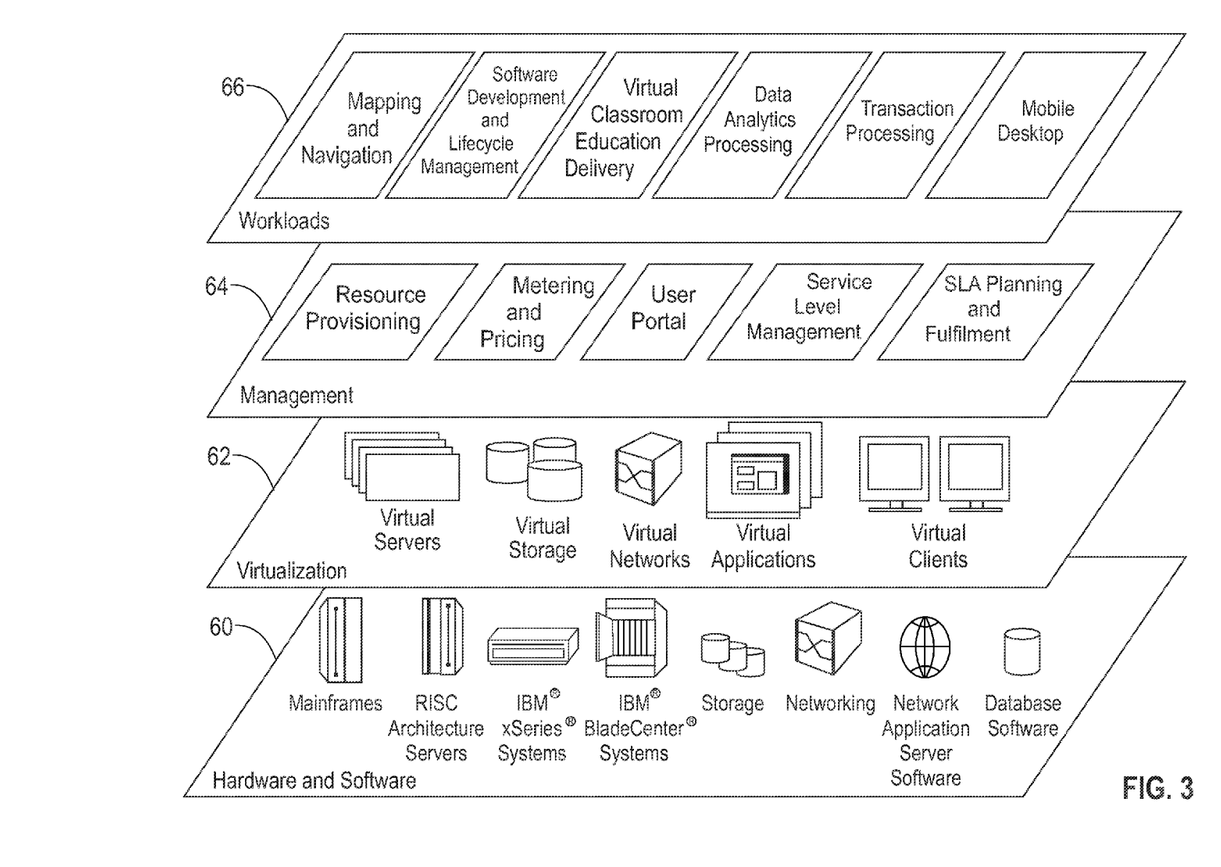
FIG. 3 depicts abstraction model layers according to a further embodiment of the present invention.

Referring now to FIG. 3, a set of functional abstraction layers provided by cloud computing environment 50 (FIG. 2) is shown. The components, layers, and functions shown in FIG. 3 are intended to be illustrative only and embodiments of the present invention are not limited. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities can be provided: virtual servers; virtual storage; virtual networks, including virtual private networks; virtual applications and operating systems; and virtual clients.

In one example, management layer 64 can provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment can be utilized. Examples of workloads and functions which can be provided from this layer include: mapping and navigation; software development and lifecycle management; virtual classroom education delivery; data analytics processing; transaction processing; and mobile desktop.

Figure 4:
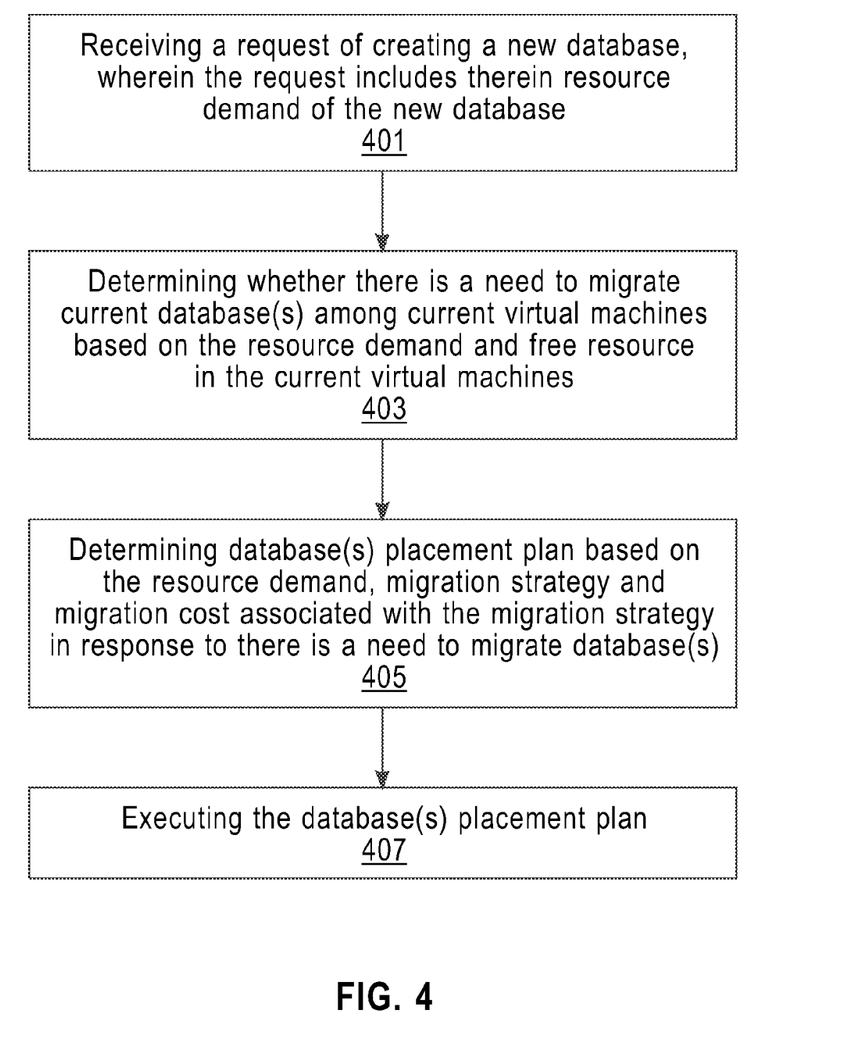
FIG. 4 depicts a flowchart of a method of placing database according to a further embodiment of the present invention.

FIG. 4 depicts a flowchart of a method of placing database according to an embodiment of the invention. One or more databases can be supported on the VM. Current database(s) on the VM can be migrated between different VMs.

Specifically, in step 401, receiving a request of creating a new database, where the request includes a resource demand of the new database.

According to an embodiment of the invention, the resource demand includes at least one of: CPU operating frequency, IO speed, storage size, and memory size.

According to another embodiment of the invention, the resource demand includes storage size and at least one of: CPU operating frequency, IO speed. Storage size is a basic attribute of creating a database. The present embodiment comprehensively considers storage size and at least one of CPU operating frequency and IO speed in determining resource demand of a database, such that resources in a VM can be allocated to the database in a more balanced way, thus avoiding waste in resource. For example, in a VM with unbalanced resource distribution, CPU has reached full load while IO is still idle, or IO has reached full load while CPU is still idle. Resource allocation in a VM can be further optimized by comprehensively considering various types of resource demands, making the allocation more balanced and making resource utilization higher.

A user tends to have different requirements for different applications. For example, database applicable to a web application is often IO intensive, such application has high demand for IO speed, but can not have high demand for CPU operating frequency and memory size the demand for storage size depends on specific application requirements. Further, for example, database for scientific computing often has high demand for CPU and memory size, but can not have high demand for IO speed, the demand for storage size also depends on specific application requirements.

The resource demand can be determined in various manners, and the present invention has no limitation; for example, the resource demand can be specified by a user directly or can also be selected under direction of a database service provider, or can be given by a database service provider according to service fee paid by a database user.

According to an embodiment of the invention, the request of creating a new database includes creating a completely new database. According to another embodiment of the invention, the request of creating a new database includes changing resource demand of a current database, for example, requesting to change storage size of the current database from 12 GB to 20 GB. According to still another embodiment of the invention, the request of creating a new database includes consolidating multiple current databases.

In step 403, determining whether there is a need to migrate current database(s) among current VMs based on the resource demand and free resource in the current VMs.

According to an embodiment of the invention, if free resource in a VM is sufficient to satisfy resource demand of the new database. For example, free storage size in the VM is 20 GB, while storage size in resource demand of the new database is 12 GB, then the current VM can satisfy the resource demand. There is no need to migrate current database(s) and a new database can be created by using current resource. According to an embodiment of the invention, the free resource can leave some redundancy, that is, in the above example, not all the free storage size (20 GB) is used to create a new database, some buffer needs to be preserved to handle urgent needs.

According to an embodiment of the invention, if free resource in a VM cannot satisfy resource demand of a new database, then there is a need to migrate the current database(s). Thus, all the resources in a VM can be utilized as completely as possible to avoid resource waste in the VM, such that the limited VM resource can be utilized to serve more database demand. Of course, the need to migrate database(s) does not necessarily mean that sufficient resource can be cleared through database migration to create a new database on current VM, the content of which will be explained in detail in the following steps.

In step 405, determining database(s) placement plan based on the resource demand, migration strategy and migration cost associated with the migration strategy in response to there is a need to migrate database(s). Migration strategy is a rule for database migration. Database(s) placement plan includes a scheme of how to place a specific database.

According to an embodiment of the invention, the migration cost includes at least one of: storage size of a database to be migrated, transaction processing ratio of a database to be migrated, user class of a database to be migrated. The migration cost can be defined as function of storage size, function of transaction processing ratio, function of user class or any combination of the above functions.

For different types of database, migration cost can be calculated in different ways. For example, for a database for storing history data, the number of database query request is small, thus migration cost mainly depends on storage size of the database. Again, for example, for a database that is accessed frequently, the number of database query request is high, thus transaction processing ratio is high, whereas storage size of the database is not necessarily to be large, thus its migration cost mainly depends on transaction processing ratio. Again, for example, for a database with high user class, due to various reasons, requester of the database wishes the database to be maintained on one VM steadily, and does not wish that database to be migrated frequently (for example, because that database often needs to be accessed by a large number of clients or by very important clients), thus its migration cost mainly depends on user class. Of course, in an extreme case, it is possible that requester of a database does not allow the database to be migrated. In a specific case, the above three factors can be combined pair wise or be combined together to collectively determine migration cost of a database. Those skilled in the art can appreciate that, depending on application of a database, other factors can also be used to determine migration cost.

TABLE 1

| Factors | applicable database type | calculation formula of migration cost |
|---|---|---|
| storage size | storage-type database | F1 (storage size) |
| transaction processing ratio | access-type database | F2 (transaction processing ratio) |
| user class | Database with special constraint | F3 (user class) |
| ... | ... | ... |

Table 1 shows how to select deterministic factors of migration cost according to database type and in turn how to select calculation formula of migration cost.

TABLE 2

| database ID | Calculation formula of migration cost | migration cost |
|---|---|---|
| DB1 | F1 | 0.1 |
| DB2 | F2 | 0.5 |
| ... | ... | ... |

Table 2 shows how to acquire values of normalized migration cost according to calculation formula of migration cost. Migration cost of different databases can be acquired based on different deterministic factors of the migration cost.

According to an embodiment of the invention, migration cost of a database is decided by which factor(s) can be automatically determined according to nature of the database. According to another embodiment of the invention, migration cost of a database is decided by which factor(s) can be manually determined.

According to an embodiment of the invention, the migration strategy includes at least one of: setting a database with low migration cost as the database to be migrated; setting a database with high benefit to cost ratio in migration as the database to be migrated; setting a database on a current virtual machine with small resource gap as the database to be migrated; and setting a database which causes small change in resource distribution balance degree on a current virtual machine at which that database is located after migration as the database to be migrated. For example, a database that causes least reduction in unbalance index on a current VM at which that database is located after migration is set as the database to be migrated. The database to be migrated can be one database or be a plurality of databases. In one embodiment, at least one database to be migrated can be generated according to one migration strategy. In another embodiment, at least one database to be migrated can be generated according to a plurality of migration strategies.

Figure 5:
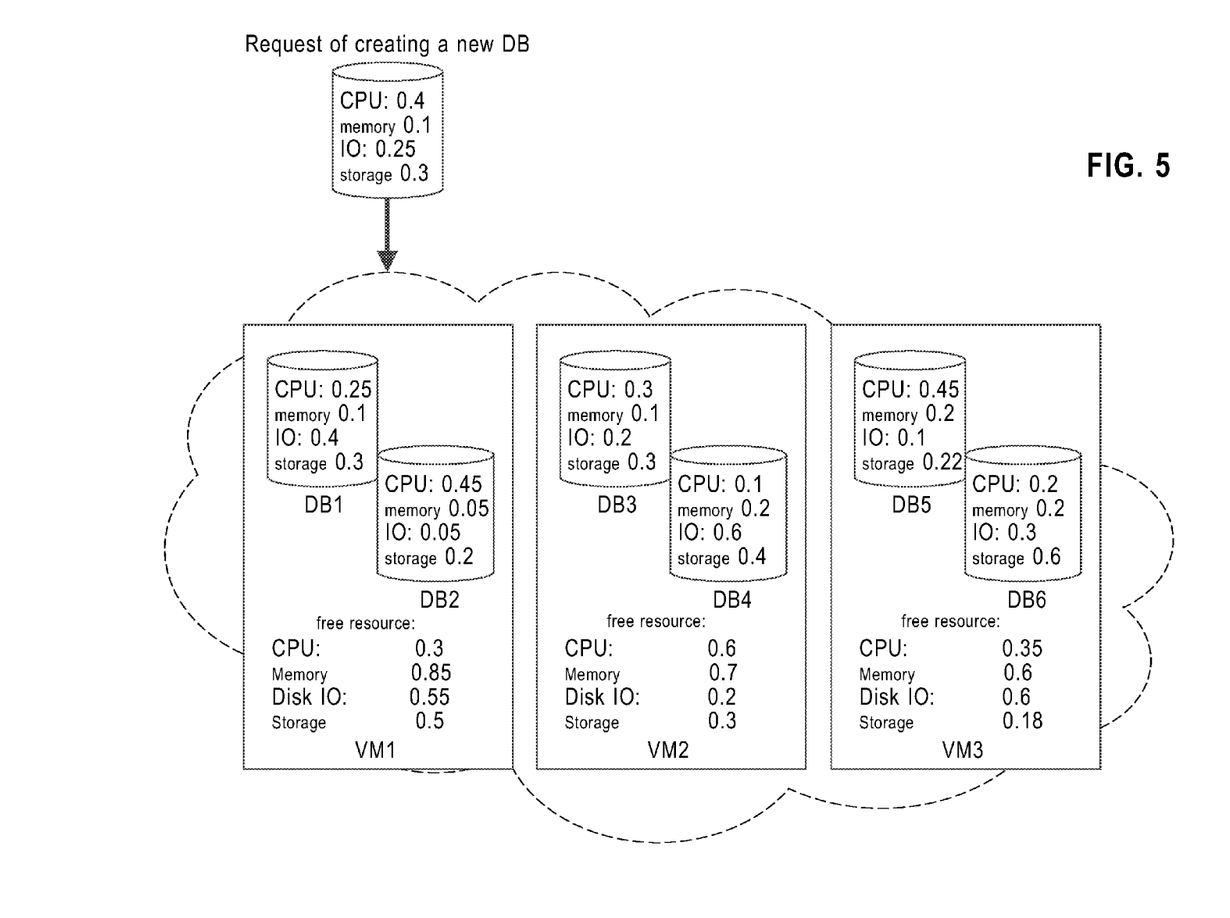
FIG. 5 depicts a system block diagram of a database service provision system that receives a request of creating a new database according to a further embodiment of the invention.

The migration strategies listed above will be explained in detail in conjunction with FIG. 5. FIG. 5 depicts a system block diagram of a database service provision system that receives a request of creating a new database according to an embodiment of the invention. In the example of FIG. 5, there are currently three VMs, two databases are created on each VM, and there is a request of creating a new database. For convenience, normalized relative values are used to describe various resources in the example of FIG. 5. For example, resource demand of the request of creating a new database includes CPU operating frequency of 0.4, memory size of 0.1, IO speed of 0.25, storage size of 0.3. Each current database (DB1-DB6) describes resource demand of that database, and each VM describes values of its free resources, description of them will be omitted for brevity. It is to be noted that, although four types of resource (CPU, IO, memory, storage) of a database are comprehensively considered in FIG. 5. The invention is not limited to necessarily consider all of the four types of resource to determine database(s) placement plan, rather, only one or more of them can be considered in determining database(s) placement plan.

According to an embodiment of the invention (for convenience, it is hereinafter referred to as embodiment 1 for short), the migration strategy includes setting a database with low migration cost as the database to be migrated. Assuming that migration cost is storage size, then in DB1-DB6, database DB2 with smallest storage size is set as the database to be migrated. In another embodiment, migration cost can be calculated with other factors (e.g. transaction processing ratio, user class etc. mentioned above).

Alternatively, a sorting table of database to be migrated can also be set, where, DB2 is a preferred database to be migrated, DB5 is a first alternative database to be migrated, and so on. This can prevent that only one database to be migrated is specified and the database to be migrated cannot be migrated due to not meeting other conditions, in which will be explained in conjunction with FIG. 6. Alternatively, the sorting table of database to be migrated can include all the current databases or can just include part of the current databases, for example, only first 3 databases in the sorted result are placed into the sorting table of database to be migrated.

According to another embodiment of the invention (for convenience, it is referred to as embodiment 2 for short), the migration strategy sets a database with high benefit to cost ratio in migration as the database to be migrated. Alternatively, the benefit is acquired based on at least one of: CPU operating frequency, IO speed, and memory size. The cost is acquired based on at least one of: storage size of a database to be migrated, transaction processing ratio of a database to be migrated, and user class of a database to be migrated. The benefit-cost ratio can be calculated with various equations, and the following description is made by only taking equation 1 for example:

$$D=(G1(\text{CPU})+G2(\text{IO})+G3(\text{memory}))/G4(\text{storage}) \quad \text{Equation 1}$$

In Equation 1 above, G1, G2, G3, G4 represent four functions constructed based on CPU operating frequency, IO speed, memory size, storage size, respectively. Taking DB1 in FIG. 5 for example, value of G1(CPU) is 0.25, value of G2(IO) is 0.4, value of G3(memory) is 0.1, value of G4(storage) is 0.3. It can be known from the following table 3 that, DB5 has the highest migration benefit-cost ratio. Migrating DB5 can obtain large benefit and consume small cost. Thus, DB5 is determined as the database to be migrated. Alternatively, the sorting table of database to be migrated can also be set in such a way that, DB5 is a preferred database to be migrated, DB2 is a first alternative database to be migrated, and so on.

TABLE 3

D(DB1) = (0.2 + 0.4 + 0.1)/0.3 = 2.5
D(DB2) = (0.45 + 0.05 + 0.05)/0.2 = 2.75
D(DB3) = (0.3 + 0.2 + 0.1)/0.3 = 2.00

TABLE 3-continued $$D(DB4) = (0.1 + 0.6 + 0.2)/0.4 = 2.25$$
$$D(DB5) = (0.45 + 0.1 + 0.2)/0.22 = 3.41$$
$$D(DB6) = (0.2 + 0.3 + 0.2)/0.6 = 1.17$$

According to another embodiment of the invention (for convenience, it is hereinafter referred to as embodiment 3 for short), the migration strategy sets a database on a current virtual machine with small resource gap as the database to be migrated. Alternatively, the resource gap represents difference between the resource demand and free resource on VM. Larger resource gap means more resource needs to be removed in order to create a new database satisfying resource demand on the current VM, on the contrary, smaller resource gap means less resources needs to be removed in order to create a new database satisfying resource demand on the current VM. Resource gap of a VM can be calculated with many equations, and the following description is made by only taking Equation 2 for example:

$$G = \sum_{i=1}^{4} (r_i - R_i) \quad \text{if } R_i < r_i \qquad \text{Equation 2}$$

According to the above Equation 2, ri is the ith resource demand of the new database, Ri is the ith free resource of VM, all ri−Ri for which Ri<ri are summed to obtain resource gap G of the VM. If some free resource on VM can satisfy requirement of the new database, value of ri−Ri will not be calculated, because value of that ri−Ri is not a resource gap, rather, it is resource redundancy.

TABLE 4

$$G(VM1) = 0.4 - 0.3 = 0.1$$
$$G(VM2) = (0.25 - 0.2) = 0.05$$
$$G(VM3) = (0.4 - 0.35) + (0.3 - 0.18) = 0.17$$

From the calculation in the above table 4, it is seen that VM2 has the smallest resource gap. The database to be migrated can be determined from VM2. According to a further embodiment, which database in the VM having the smallest resource gap (e.g. VM2) is the database to be migrated can be further determined based on various suitable rules, for example, database (e.g. DB3) with smallest cost (e.g. with smallest storage size) in VM2 can be determined as the database to be migrated. Alternatively, sorting table of database to be migrated can also be set in such a way that DB3 is a preferred database to be migrated, DB4 is a first alternative database to be migrated, DB2 is a second alternative database to be migrated, and so on.

According to another embodiment of the invention (for convenience, it is referred to as embodiment 4 for short), the migration strategy sets a database which causes small change in resource distribution balance degree on a current virtual machine at which that database is located after migration as the database to be migrated, for example, a database that causes least change in unbalance index on a VM at which that database is located is set as the database to be migrated, the unbalance index represents unbalance degree of resource allocation on a VM. As mentioned above, unbalanced resource utilization can cause resource waste on VM, for example, CPU utilization has reached saturation, whereas IO utilization is far from saturation. Thus, resource waste can be avoided by utilizing various resources on VM in a balanced way, and the limited VMs are utilized to support as many database as possible. Balance degree can be calculated with various equations, and the following description is made by only taking equations 3-5 for example.

$$u_k = \sum_{i=1}^{4} E_{k,i}/4 \qquad \text{Equation 3}$$

In Equation 3, k represents the kth VM, i represents the ith resource (e.g. four resources are shown in FIG. 5), Ek,i represents occupation value of the ith current resource on the kth VM (e.g. occupation value of current CPU resource on VM1 is sum of 0.25 of DB1 and 0.45 of DB2, i.e. 0.7; if DB1 is to be removed from VM1, then E1,1 represents that occupation value of CPU of database on VM1 is 0.45), uk represents average value of occupation values of various resources on the kth VM.

$$\delta_k = \sqrt{\sum_{i=1}^{4} (E_{k,i} - u_k)^2 / 4} \qquad \text{Equation 4}$$

In Equation 4, δk represents unbalance index of resource distribution on the kth VM by calculating standard variance of resource distribution; the more unbalanced the resource distribution on the kth VM is, the larger the value of δk; the more balanced the resource distribution on the kth VM is, the smaller the value of δk.

$$V_k(DB_m) = \delta_k(\text{Current}) - \delta_k(DB_m) \qquad \text{Equation 5}$$

In Equation 5, $\delta_k$ (Current) represents current unbalance index on the kth VM, $\delta_k(DB_m)$ represents unbalance index on the kth VM after the mth DB has been removed. $V_k(DB_m)$ represents reduction in unbalance index on the kth VM caused by removing the mth DB from the kth VM. The larger the value of $V_k(DB_m)$, the larger the change in resource distribution unbalance degree on the kth VM caused by removing the mth DB, and the smaller the value of $V_k(DB_m)$, the smaller the change in resource distribution unbalance degree on the kth VM caused by removing the mth DB. Thus, in migration strategy of the present embodiment, the database that causes least reduction in unbalance index on a VM at which that database is located after migration is set as the database to be migrated.

TABLE 5

$$V1(DB1) = 0.03856$$
$$V1(DB2) = 0.1023$$
$$V2(DB3) = 0.01631$$
$$V2(DB4) = 0.1423$$
$$V3(DB5) = 0.01619$$
$$V3(DB6) = 0.05753$$

Values of $V_k(DB_m)$ calculated according to Equations 3-5 are shown in table 5, where value of $V_3(DB_5)$ is the smallest, which means that DB5 causes least reduction in unbalance index on the VM at which DB5 is located after migration and DB5 is thus set as the database to be migrated.

Alternatively, the sorting table of database to be migrated can also be set in such a way that DB5 is a preferred database to be migrated, DB3 is a first alternative database to be migrated, and so on.

In addition to the above-mentioned four migration strategies, the present invention can also employ other migration strategy to choose a database to be migrated, or combine the above migration strategies, description of which will be omitted here for brevity.

After a database to be migrated is chosen in migration strategy, a target VM to which the database to be migrated will be migrated can be determined through various manners. In an embodiment, the target VM can be determined based on whether free resource of the VM can satisfy resource demand of the database to be migrated. As shown in the above embodiment 1, the target VM of database DB2 to be migrated can only be VM2 rather than VM3, because free resource of VM3, i.e., storage, is 0.18 which cannot satisfy resource requirement 0.2 on storage resource of DB2, and free resource of VM3, i.e., CPU, is 0.35 which also cannot satisfy resource requirement 0.45 on CPU resource of DB. Similarly, in embodiment 2, the target VM of database DB5 to be migrated can only be VM2 rather than VM1. In embodiment 3, the database DB3 to be migrated does not have a target VM satisfying the above conditions. Of course, in a specific embodiment, it can also be further evaluated whether other alternative databases to be migrated in embodiment 3 have a target VM satisfying the above conditions. In embodiment 4, database DB5 to be migrated does not have a target VM satisfying the above conditions.

If there are two or more VMs that can satisfy resource demand of a database to be migrated, a target VM can be selected from multiple VMs by employing a variety of implementations. For example, in one embodiment, the target VM can be randomly selected. Again, for example, in another embodiment, a VM, which causes largest improvement in resource distribution balance degree of a target VM if the database to be migrated is migrated to that target VM, can be selected as the target VM (e.g. a VM with lowest unbalance index), for example, DB1 can be migrated to VM2 or VM3, unbalance index of VM2 reduces by 0.1 after DB1 is migrated to VM2, whereas unbalance index of VM3 reduces by 0.2 after DB1 is migrated to VM3, thus, DB1 is migrated to VM3 in the migration strategy. Of course, other manners can also be used to select a target VM.

Further, in an embodiment, the target VM can be one VM, while in another embodiment, the target VM can be multiple VMs, alternatively, they can be represented as a sorting table of target VMs, for example, VM1 is a preferred target VM, VM2 is a first alternative target VM, and so on. This can prevent that only one target VM is specified and that target VM makes database migration cannot be performed due to that target VM not satisfying other conditions in other steps. Alternatively, the sorting table of target VM can include all the VMs that can satisfy resource demand of a database to be migrated or can just include part of VMs that can satisfy resource demand of a database to be migrated, for example, the sorting table can be set to contain only two VMs at most.

Alternatively, the migration strategy further includes: ensuring that there is no degradation in total resource distribution balance degree of the VMs after migrating the database to be migrated, for example, ensuring that there is no rise in total unbalance index (i.e. sum of unbalance indices of each VM) of VM after migrating the database to be migrated, where the unbalance index represents unbalance degree of resource distribution on a VM. The above feature can at least bring the following advantages: ensures that there is no degradation in overall VM balance degree after current migration, e.g. ensures that overall VM balance degree has been somewhat improved or remains unchanged, so as to optimize database(s) placement plan and reduce resources waste due to unbalanced resource utilization. According to an embodiment of the present invention, if database migration is allowed to be performed only once, then the migration strategy ensures that there is no degradation in total unbalance degree of VM after the database to be migrated has been migrated for once. According to another embodiment of the present invention, if database migration is allowed to be performed for multiple times, then the migration strategy ensures that there is no rise in total unbalance degree of VM as compared to un-migrated state after migration has been performed for multiple times.

For example, taking the above-mentioned equations 3-5 for example, unbalance index $\delta k$ of the kth VM can be acquired through equation 4, and whether there is rise in total unbalance index can be determined by comparing total unbalance index $$\sum_{k=1}^{3} \delta_k$$

of each VM before migration with total unbalance index of each VM after migration.

Returning to FIG. 4, in step 407, executing the database(s) placement plan.

With the embodiment shown in FIG. 4, a database service provider can use limited resource to serve more database users through optimized database layout.

According to an embodiment of the invention, determining database(s) placement plan further includes: judging whether the migration strategy can satisfy the resource demand; judging whether total migration cost of the migration strategy exceeds a predetermined threshold; and determining the database(s) placement plan based on the migration strategy in response to the migration strategy can satisfy the resource demand and the total migration cost does not exceed the predetermined threshold.

Figure 6:
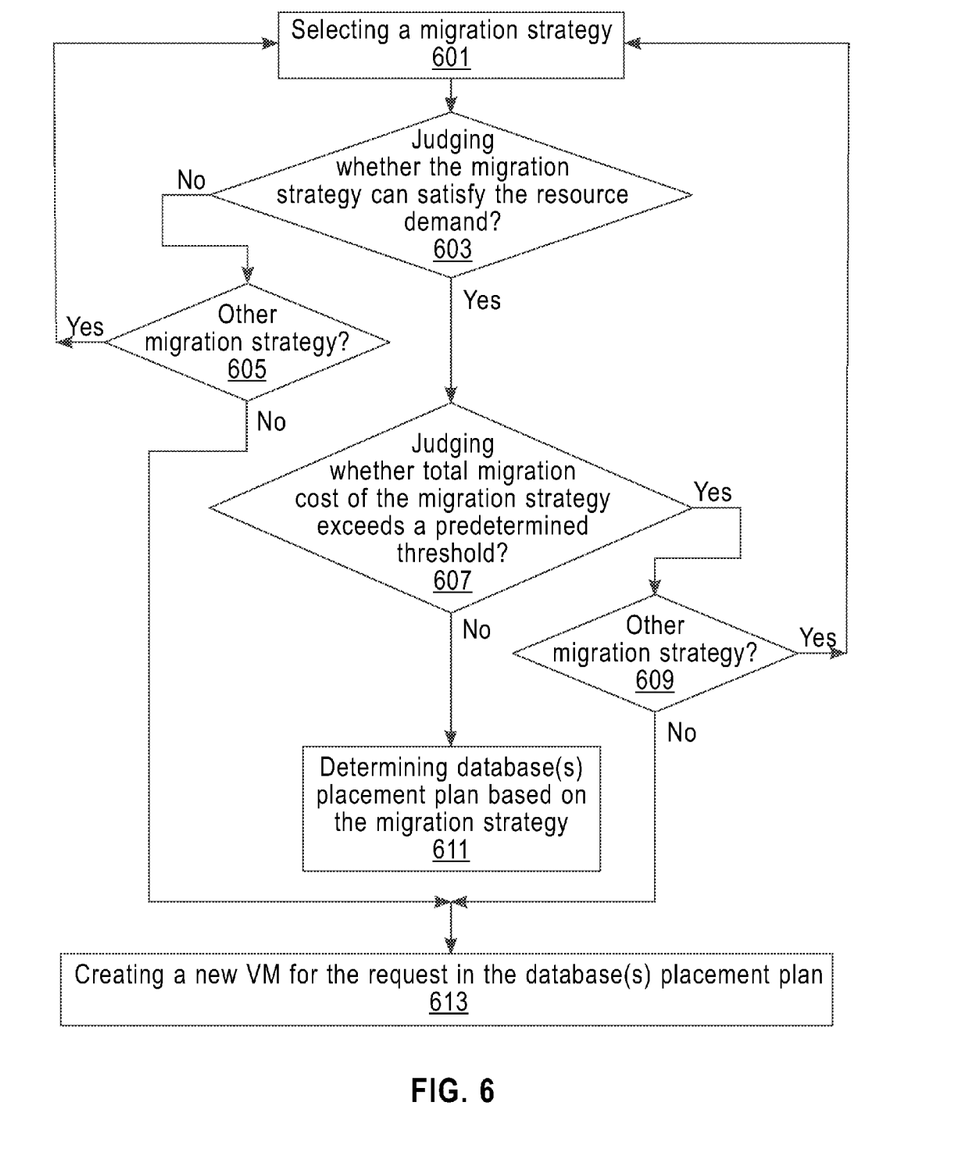
FIG. 6 depicts a flowchart of a method of determining database(s) placement plan according to a further embodiment of the invention.

This will be explained in detail below in accordance with FIG. 6. FIG. 6 depicts a flowchart of a method of determining database(s) placement plan according to an embodiment of the invention. In step 601, selecting a migration strategy. The migration strategy has been explained above and description of which will be omitted. According to an embodiment of the invention, step 601 can include: selecting one migration strategy from a plurality of migration strategies. According to another embodiment of the invention, step 601 can include: confirming whether one migration strategy is selected within that migration strategy. According to yet another embodiment of the invention, if there is only one migration strategy, step 601 can be omitted and that migration strategy is directly applied without selection. The selection can include manual selection, automatic selection or combination thereof etc.

In step 603, judging whether the migration strategy can satisfy the resource demand. The resource demand is resource demand of a request of creating a new database. According to an embodiment of the invention, step 603 further includes: judging whether sufficient resource can be made to be provided to a new database to be created after database is migrated in accordance with the migration strategy. For example, in above embodiment 1, after DB2 is moved to VM2, free resource on VM1 is CPU 0.8, memory 0.9, IO 0.6, storage 0.45, which can satisfy resource demand of the new database (i.e. CPU 0.4, memory 0.1, IO 0.25, storage 0.3).

In response to judging result of step 603 being negative, i.e. the migration strategy cannot satisfy resource demand of the new database, the method proceeds to step 605 of judging whether there is any other migration strategy. In response to there being other migration strategy, the method proceeds to step 601 of selecting a migration strategy again. In response to there being no other migration strategy, the method proceeds to step 613 of creating a new virtual machine for the request in the database(s) placement plan.

According to an embodiment of the invention, step 605 can be omitted. For example, if there is only one migration strategy, the method can directly proceed to step 613 of creating a new virtual machine for the request in response to judging result of step 603 being negative.

According to an embodiment of the invention, step 613 can be varied as rejecting the request of creating a new database. For example, in case that physical resource has reached saturation, new VM can no longer be created for a new database, the request of creating a new database can only be rejected.

In response to judging result of step 603 being positive, the method proceeds to step 607 of judging whether total migration cost of the migration strategy exceeds a predetermined threshold. Controlling total migration cost can ensure that only migration strategy that saves cost is applied, so as to utilize resource efficiently.

In response to judging result of step 607 being positive, i.e. total migration cost exceeds a predetermined threshold, the method proceeds to step 609 of judging whether there is any other migration strategy. In response to there being another migration strategy, the method proceeds to step 601 of selecting a migration strategy again. In response to there being no other migration strategy, the method proceeds to step 613 of creating a new virtual machine for the request in the database(s) placement plan.

In response to judging result of step 607 being negative, i.e. total migration cost does not exceed the predetermined threshold, the method proceeds to step 611 of determining database(s) placement plan based on the migration strategy. According to an embodiment of the invention, the database(s) placement plan includes a database to be migrated, a target VM of a database to be migrated, a VM receiving a request of creating a new database.

Those skilled in the art can appreciate that, according to another embodiment of the invention, the order of step 603 and step 607 can be exchanged, i.e., step 607 is performed first, and then step 603 is performed. According to still another embodiment of the invention, step 603 and step 607 can be performed independently with each other without any necessary order. In step 611, determining database(s) placement plan based on the migration strategy in response to the migration strategy can satisfy the resource demand and the total migration cost does not exceed the predetermined threshold. In step 613, creating a new VM for the request in the database(s) placement plan in response to the migration strategy cannot satisfy the resource demand or the total migration cost exceeds the predetermined threshold.

The method of placing database on a VM in the invention has been described above, and a system of placing database on a VM under a same inventive concept will be described below in conjunction with FIG. 7 through FIG. 8, where same or corresponding implementation details will be omitted since detailed and completed explanation have been provided above.

Figure 7:
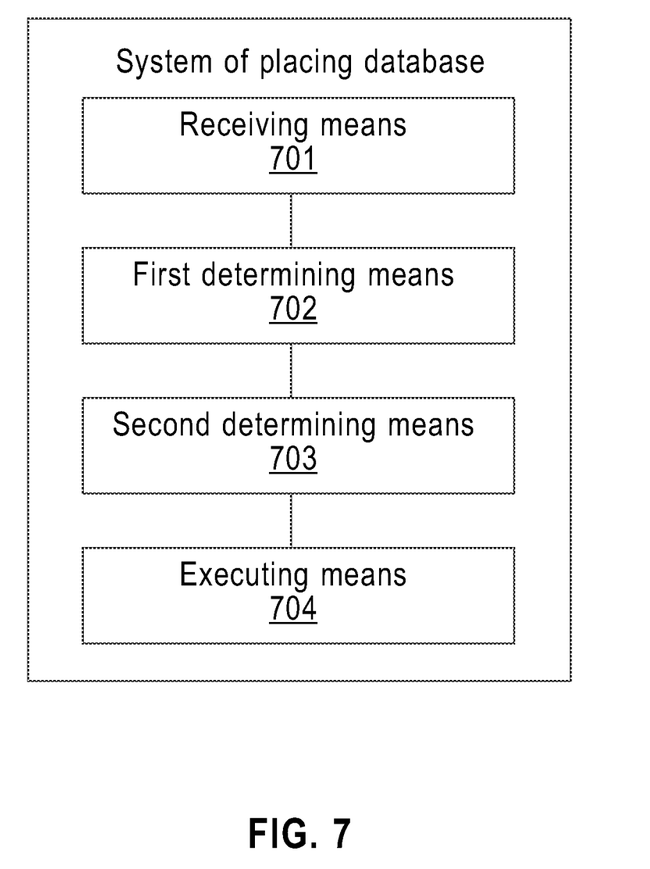
FIG. 7 depicts a block diagram of a system of placing database(s) according to a further embodiment of the invention.

FIG. 7 depicts a block diagram of a system of placing database according to an embodiment of the invention. The system includes: a receiving means 701, a first determining means 702, a second determining means 703 and an executing means 704. The receiving means 701 is configured to receive a request of creating a new database, where the request includes therein resource demand of the new database. The first determining means 702 is configured to determine whether there is a need to migrate current database(s) among current virtual machines based on the resource demand and free resource in the current virtual machines. The second determining means 703 is configured to determine database(s) placement plan based on the resource demand, migration strategy and migration cost associated with the migration strategy in response to there is a need to migrate database(s). The executing means 704 is configured to execute the database(s) placement plan.

According to an embodiment of the invention, the resource demand includes storage size and at least one of the following resources: CPU operating frequency, IO speed.

According to an embodiment of the invention, the migration cost includes at least one of the following factors: storage size of a database to be migrated, transaction processing ratio of a database to be migrated, user class of a database to be migrated.

According to an embodiment of the invention, the migration strategy includes at least one of the following: setting a database with low migration cost as the database to be migrated; setting a database with high benefit to cost ratio in migration as the database to be migrated; setting a database on a current virtual machine with small resource gap as the database to be migrated; and setting a database which causes small change in resource distribution balance degree on a current virtual machine at which that database is located after migration as the database to be migrated.

According to an embodiment of the present invention, the benefit is acquired based on at least one of: CPU operating frequency, IO speed, and memory size; and the cost is acquired based on at least one of: storage size of a database to be migrated, transaction processing ratio of a database to be migrated, user class of a database to be migrated.

According to an embodiment of the invention, where the second determining means is further configured to ensure that there is no degradation in total resource distribution balance degree of the current virtual machines after migrating the database to be migrated.

According to an embodiment of the present invention, the second determining means is further configured to select a target virtual machine such that improvement in resource distribution balance degree of the target virtual machine is the largest after migrating the database to be migrated to the target virtual machine.

Figure 8:
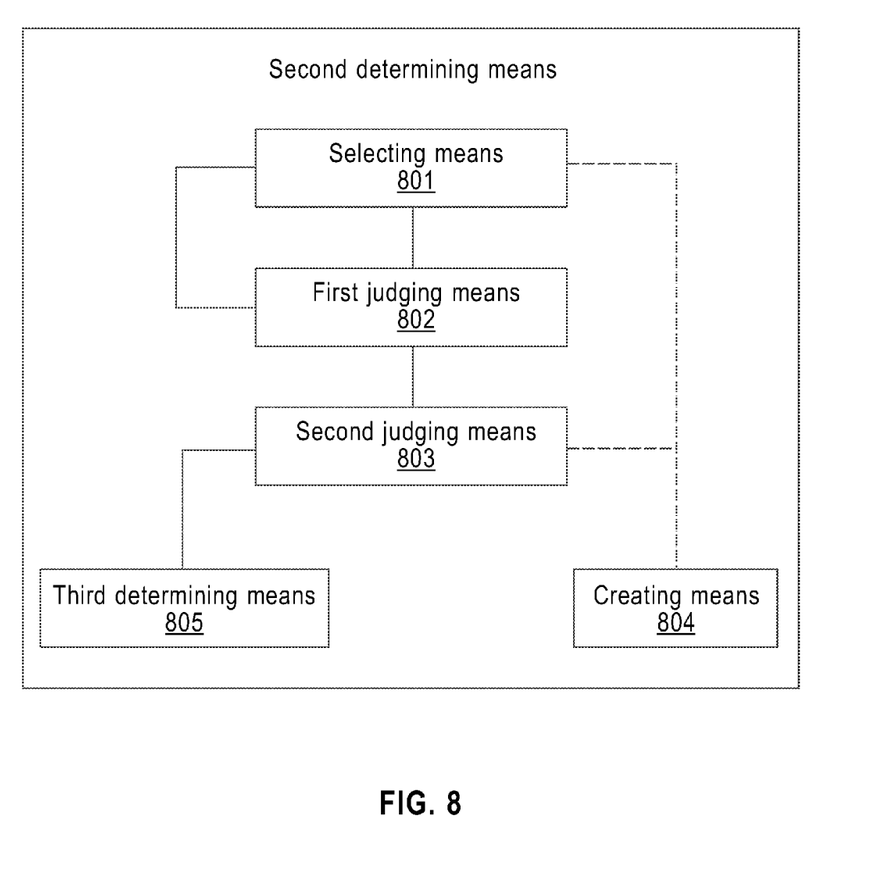
FIG. 8 depicts a block diagram of the second determining means according to a further embodiment of the invention.

According to an embodiment of the invention, FIG. 8 depicts a block diagram of the second determining means according to an embodiment of the invention. FIG. 8 includes a selecting means 801, a first judging means 802, a second judging means 803, and a third determining means 805. The first judging means 802 is configured to judge whether the migration strategy can satisfy the resource demand. The second judging means 803 is configured to judge whether total migration cost of the migration strategy exceeds a predetermined threshold. The third determining means 805 is configured to determine the database(s) placement plan based on the migration strategy in response to the migration strategy can satisfy the resource demand and the total migration cost does not exceed the predetermined threshold.

According to another embodiment of the invention, FIG. 8 further includes a creating means 804 configured to create a new virtual machine for the request in the database(s) placement plan in response to the migration strategy can not satisfy the resource demand.

According to still another embodiment of the invention, the creating means in FIG. 8 is further configured to create a new virtual machine for the request in the database(s) placement plan in response to the total migration cost exceeds the predetermined threshold.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed.

What is claimed is:

1. A method comprising:
   receiving a request to create a new database instance, wherein the request includes a resource demand indicating a resource required by the new database instance;
   deciding that there is a need to migrate at least one existing database instance among a plurality of virtual machines that are shared by users in a cloud computing environment, wherein one of the plurality of virtual machines currently supports the existing database instance, wherein the deciding is based on the resource demand and on an amount of unused resources among the plurality of virtual machines, and wherein the plurality of virtual machines is hosted by a set of nodes in the cloud computing environment, each node in the set of nodes including a processor, a memory, and an interface for communicating with an end user device;
   determining a database placement plan for migrating the at least one existing database instance based on at least one of: the resource demand, a migration strategy, and a migration cost associated with the migration strategy, wherein the database placement plan minimizes an amount of the unused resources among the plurality of virtual machines; and
   migrating the at least one existing database instance from the one of the plurality of virtual machines to a target virtual machine of the plurality of virtual machines without migrating the one of the plurality of virtual machines or the target virtual machine of the plurality of virtual machines, according to the database placement plan, wherein the target virtual machine is different from the one of the plurality of virtual machines.

2. The method according to claim 1, wherein the determining the database placement plan further comprises:
   judging whether the migration strategy satisfies the resource demand;
   judging whether the migration cost associated with the migration strategy exceeds a predetermined threshold; and
   basing the database placement plan on the migration strategy when the migration strategy satisfies the resource demand and the migration cost does not exceed the predetermined threshold.

3. The method according to claim 1, wherein the resource demand comprises at least one of: storage size, central processing unit operating frequency, or 10 speed.

4. The method according to claim 1, wherein the migration cost comprises at least one of:
   a storage size of the at least one existing database instance;
   a transaction processing ratio of the at least one existing database instance; and
   a user class of the at least one existing database instance.

5. The method according to claim 1, wherein the migration strategy comprises at least one of:
   setting a database with low migration cost as the at least one existing database instance;
   setting a database with high benefit to cost ratio in migration as the at least one existing database instance;
   setting a database on the one of the plurality of virtual machines with small resource gap as the at least one existing database instance; and
   setting a database that causes a small change in a resource distribution balance degree on the one of the plurality of virtual machines after migration as the at least one existing database instance.

6. The method according to claim 5, wherein:
   a benefit of the benefit to cost ratio is acquired based on at least one of: a central processing unit operating frequency, an input/output speed, and a memory size; and
   a cost of the benefit to cost ratio is acquired based on at least one of: a storage size of the at least one existing database instance, a transaction processing ratio the at least one existing database instance, and a user class of the at least one existing database instance.

7. The method according to claim 1, wherein the determining the database placement plan further comprises:
   judging whether the migration strategy satisfies the resource demand; and
   provisioning a new virtual machine in addition to the plurality of virtual machines to host the new database instance in the database placement plan when the migration strategy does not satisfy the resource demand.

8. The method according to claim 1, wherein the determining the database placement plan further comprises:
   judging whether the migration cost of the migration strategy exceeds a predetermined threshold; and
   provisioning a new virtual machine in addition to the plurality of virtual machines to host the new database instance in the database placement plan when the migration cost exceeds the predetermined threshold.

9. The method according to claim 1, wherein the determining the database placement plan further comprises:
   determining whether a degradation will occur in the plurality of virtual machines after migrating the at least one existing database instance.

10. The method according to claim 1, wherein the determining the database placement plan further comprises:
    selecting the target virtual machine from among the plurality of virtual machines so that an improvement in a resource distribution balance degree of the target virtual machine is largest after migrating the at least one existing database instance to the target virtual machine.

11. A system comprising:
    a receiving means configured to receive a request to create a new database instance, wherein the request includes a resource demand indicating a resource required by the new database instance;
    a first determining means configured to decide that there is a need to migrate at least one existing database instance among a plurality of virtual machines that are shared by users in a cloud computing environment, wherein one of the plurality of virtual machines currently supports the existing database instance, wherein the deciding is based on the resource demand and on an amount of unused resources among the plurality of virtual machines, and wherein the plurality of virtual machines is hosted by a set of nodes in the cloud computing environment, each node in the set of nodes including a processor, a memory, and an interface for communicating with an end user device;

a second determining means configured to determine a database placement plan for migrating the at least one existing database instance based on at least one of: the resource demand, a migration strategy, and a migration cost associated with the migration strategy, wherein the database placement plan minimizes an amount of the unused resources among the plurality of virtual machines; and a migrating means configured to migrate the at least one existing database instance from the one of the plurality of virtual machines to a target virtual machine of the plurality of virtual machines without migrating the one of the plurality of virtual machines or the target virtual machine of the plurality of virtual machines, according to the database placement plan, wherein the target virtual machine is different from the one of the plurality of virtual machines.

12. The system according to claim 11, wherein the second determining means further comprises:
a first judging means configured to judge whether the migration strategy satisfies the resource demand;
a second judging means configured to judge whether the migration cost associated with the migration strategy exceeds a predetermined threshold; and
a third determining means configured to base the database placement plan on the migration strategy when the migration strategy satisfies the resource demand and the migration cost does not exceed the predetermined threshold.

13. The system according to claim 11, wherein the resource demand comprises at least one of: storage size, central processing unit operating frequency, or 10 speed.

14. The system according to claim 11, wherein the migration cost comprises at least one of:
a storage size of the at least one existing database instance;
a transaction processing ratio of the at least one existing database instance; and
a user class of the at least one existing database instance.

15. The system according to claim 11, wherein the migration strategy comprises at least one of:

setting a database with low migration cost as the at least one existing database to instance;
setting a database with high benefit to cost ratio in migration as the at least one existing database instance;
setting a database on the one of the plurality of virtual machines with small resource gap as the at least one existing database instance; and
setting a database which causes small change in a resource distribution balance degree on the one of the plurality of virtual machines after migration as the at least one existing database instance.

16. The system according to claim 15, wherein a benefit of the benefit to cost ratio is acquired based on at least one of:
a central processing unit operating frequency, an input/output speed, and a memory size; and
a cost of the benefit to cost ratio is acquired based on at least one of: a storage size of the at least one existing database instance, a transaction processing ratio of the at least one existing database instance, and a user class of the at least one existing database instance.

17. The system according to claim 11, wherein the second determining means further comprises:
a first judging means configured to judge whether the migration strategy satisfies the resource demand;
a provisioning means configured to provision a new virtual machine in addition to the plurality of virtual to host the new database instance in the database placement plan when the migration strategy does not satisfy the resource demand.

18. The system according to 11, wherein the second determining means further comprises:
a second judging means configured to judge whether the migration cost of the migration strategy exceeds a predetermined threshold; and
a provisioning means configured to provision a new virtual machine in addition to the plurality of virtual machines to host the new database instance in the database placement plan when the migration cost exceeds the predetermined threshold.

19. The system according to claim 11, wherein the second determining means is further configured to determine whether a degradation will occur in the plurality of virtual machines after migrating the at least one existing database instance.

20. The system according to claim 11, wherein the second determining means is further configured to:
select the target virtual machine from among the plurality of virtual machines such that an improvement in a resource distribution balance degree of the target virtual machine is largest after migrating the at least one existing database instance to the target virtual machine.

* * * * *